United States Patent
Fodor

(10) Patent No.: US 6,289,403 B1
(45) Date of Patent: Sep. 11, 2001

(54) METHOD AND ARRANGEMENT FOR CONTROLLING A DATA TRANSMISSION

(75) Inventor: Robert Fodor, Augsburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/190,357

(22) Filed: Nov. 12, 1998

(30) Foreign Application Priority Data

Nov. 11, 1997 (DE) .............................................. 197 49 931

(51) Int. Cl.[7] .............................. G06F 13/10; G06F 13/14
(52) U.S. Cl. ................................. 710/52; 710/58; 710/60; 711/153
(58) Field of Search .................................. 710/1, 52, 58, 710/60; 711/100, 153

(56) References Cited

U.S. PATENT DOCUMENTS

| | | | |
|---|---|---|---|
| 4,200,930 | * 4/1980 | Rawlings et al. | 364/200 |
| 5,301,279 | * 4/1994 | Riley et al. | 395/275 |
| 5,613,162 | * 3/1997 | Kabenjian | 395/842 |
| 5,821,950 | * 10/1998 | Rentschler et al. | 345/505 |
| 5,862,366 | * 1/1999 | Schmidt et al. | 395/500 |
| 5,872,998 | * 2/1999 | Chee | 395/876 |
| 5,911,056 | * 6/1999 | Faget et al. | 395/309 |

FOREIGN PATENT DOCUMENTS 0 629 956 A2  12/1994 (EP) .

OTHER PUBLICATIONS

A data sheet, 82439HX System Controller (TXC), of the firm Intel, Jul. 1996, Order No. 290551–001, pp. 5–6, in particular.

* cited by examiner

Primary Examiner—Thomas Lee
Assistant Examiner—Rehana Perveen
(74) Attorney, Agent, or Firm—Schiff Hardin & Waite

(57) ABSTRACT

For a bidirectional data transfer between a system bus (CPU-Bus) and a peripheral bus (PCI-Bus) the two busses are connected to each other via a coupling device (BRIDGE). The coupling device (BRIDGE) respectively has two (one per direction) means-specific temporary storage units (FIFO1, . . . , FIFOn) for all peripheral devices connected to the peripheral bus (PCI-Bus).

10 Claims, 5 Drawing Sheets

METHOD AND ARRANGEMENT FOR CONTROLLING A DATA TRANSMISSION

BACKGROUND OF THE INVENTION

The present invention relates to a method for controlling a data transmission.

In contemporary data transmission means, particularly in personal computers, what is known as a PCI bus (Peripheral Component Interconnect) is set up for a connection of peripheral means such as an LAN (Local Area Network). The peripheral means are connected to the PCI bus via defined interfaces which are controlled via what are known as I/O controllers. For a data transfer between the peripheral means and other units such as a processor unit or a main memory connected to the processor unit via a processor bus, for example, the PCI bus is connected to the processor bus via a coupling means frequently referred to as a bridge.

The data sheet "82439HX System Controller (TXC)" of the firm Intel (July 1996, order number 290551-001, p. 5 and 6 in particular) teaches such a bridge which connects a PCI bus to a processor bus (processor host bus) and a central memory (main memory). The bridge comprises two temporary storage units for a data transfer between the PCI bus and a processor unit, or respectively, the main memory. Those data which are transmitted from the processor unit to a peripheral means connected to the PCI bus, or vice versa, on the basis of an initiative of the processor unit are temporarily stored in a first temporary storage unit. Those data which are transmitted to the main memory from a peripheral means connected to the PCI bus, or vice versa, on the basis of an initiative of said means are temporarily stored in a second temporary storage unit.

The first and the second temporary storage units are respectively fashioned as FIFO (First In First Out) memories in which the data to be transmitted are stored together with an address identifying the respective peripheral means.

SUMMARY OF THE INVENTION

It is an object of the present invention to provide a method by which the degree of effectivity of a data transfer between two system busses is increased.

For a better understanding of the functions and the operation of a bridge it seems necessary to initially elaborate on known principles with the aid of a PCI bus architecture realized in a personal computer.

If a processor unit requests data from a peripheral means, then the processor unit outputs a read request to the processor bus along with the address of an I/O controller allocated to the peripheral means. A first module with a first functional unit of the bridge recognizes the address of the peripheral means and transmits the read request to a second module of the first functional unit. This outputs the read request with the address of the I/O controller onto the PCI bus. The addressed I/O controller recognizes the read request directed thereto and outputs the requested data to the PCI bus. The second module of the first functional unit incorporates the requested data into a first submemory of the FIFO memory of the first functional unit. The first module of the first functional unit reads the data from the first submemory of the FIFO memory and outputs them to the processor bus, from which they are read by the processor unit.

When a processor unit transmits data to a peripheral means, the processor unit outputs a write request to the processor bus and subsequently outputs the data to be transmitted to the processor bus along with the address of an I/O controller allocated to the peripheral means. The first module of the first functional unit of the bridge recognizes the address of the peripheral means and transmits the write request to the second module of the first functional unit. The first module simultaneously writes the data to be transmitted into a second submemory of the FIFO memory of the first functional unit. The second module applies the write request to the PCI bus. The addressed I/O controller recognizes the write request directed thereto and signals its readiness to receive data to the bridge. The second module of the first functional unit then reads the data from the second submemory of the FIFO memory and outputs them to the PCI bus, the I/O controller taking them over from there.

If data of a peripheral means are to be stored in the main memory on the basis of a request of an I/O controller, the I/O controller writes these data to the PCI bus along with the address at which the data should be stored in the main memory. A first module of a second functional unit recognizes the address in the main memory and writes the data with the appertaining address into a first submemory of a FIFO memory of the second functional unit. A second module of the second functional unit reads the data from the first submemory of the FIFO memory and outputs them to the processor bus together with the address at which the data are to be stored in the main memory. The main memory recognizes the addresses and stores the data at the corresponding location in the main memory.

If data is to be read from the main memory on the basis of a request of an I/O controller, the I/O controller outputs a corresponding read request to the PCI bus with the address of the desired data in the main memory. The first module of the second functional unit recognizes the address in the main memory and transmits the read request to the second module of the second functional unit. This outputs the read request to the processor bus together with the address in the main memory. The main memory recognizes the read request and outputs the requested data to the processor bus. The second module of the second functional unit takes over the data from the processor bus and writes the requested data into a second submemory of the FIFO memory of the second functional unit. The first module of the second functional unit reads the data from the second submemory of the FIFO memory and outputs them to the PCI bus together with the address of the requested I/O controller, from which they are read by the I/O controller.

A distribution of free bus capacities, that is, the allocation of who can write data to a bus as "master", ensues via an arbitration module specific to the bus. An arbitration module of the processor bus manages request messages released by the processor unit and by the second module of the second functional unit, for example, for an accessing of the processor bus. An arbitration module of the PCI bus manages request messages released by the I/O controllers and by the second module of the first functional unit, for example, for an accessing of the PCI bus.

Different priorities can be allocated to the individual request messages for a system bus; that is, given time-critical data a timely allocation of the master function for the system bus to the waiting unit ensues even given a high loading of the corresponding system bus. A higher priority is assigned to a request message for speech data to be transmitted than to a request for the transmission of non-time-critical security data, for example.

The data transfer between peripheral means, or respectively, units of the central computer system, and the bridge ensues by means of burst operations. In burst operations a plurality of data packets are transmitted in succession, whereby the appertaining destination address is not co-transmitted for every individual data packet. Only the address of a memory cell into which the first data packet is to be written is transmitted. The subsequent data packets are automatically written into the subsequent memory cells.

The length of a burst operation is individually adjustable for each unit transmitting data. The length is determined by a latency timer specific to the unit. The length of a burst operation is explicitly prescribed by the time set for the latency timer, that is, the time during which a unit may write data onto a system bus. By the prescription of how long a unit may occupy a system bus it is guaranteed that each unit connected to the system bus can transmit the requested data even given high loading of the system bus.

The inventive method offers the advantage that in a transmission of data between the system bus and the peripheral bus an intermediate storage of data allocated to a respective means in a temporary storage unit specific to the means is performed, whereby the data allocated to a means is collected and subsequently transmitted in a block. For a transmission of a plurality of data packets (data packets from a plurality of burst operations) only one accessing of a system bus is necessary, whereby a saving of the time necessary for the other bus accesses is achieved, and so a plurality of accesses onto one system bus can be realized at the same time.

Based on a respectively individual definition of a storage fill value upon the attainment of which an output of data onto a system bus is begun an optimal loading of the system bus is achieved according to the configuration of the means connected to a system bus.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
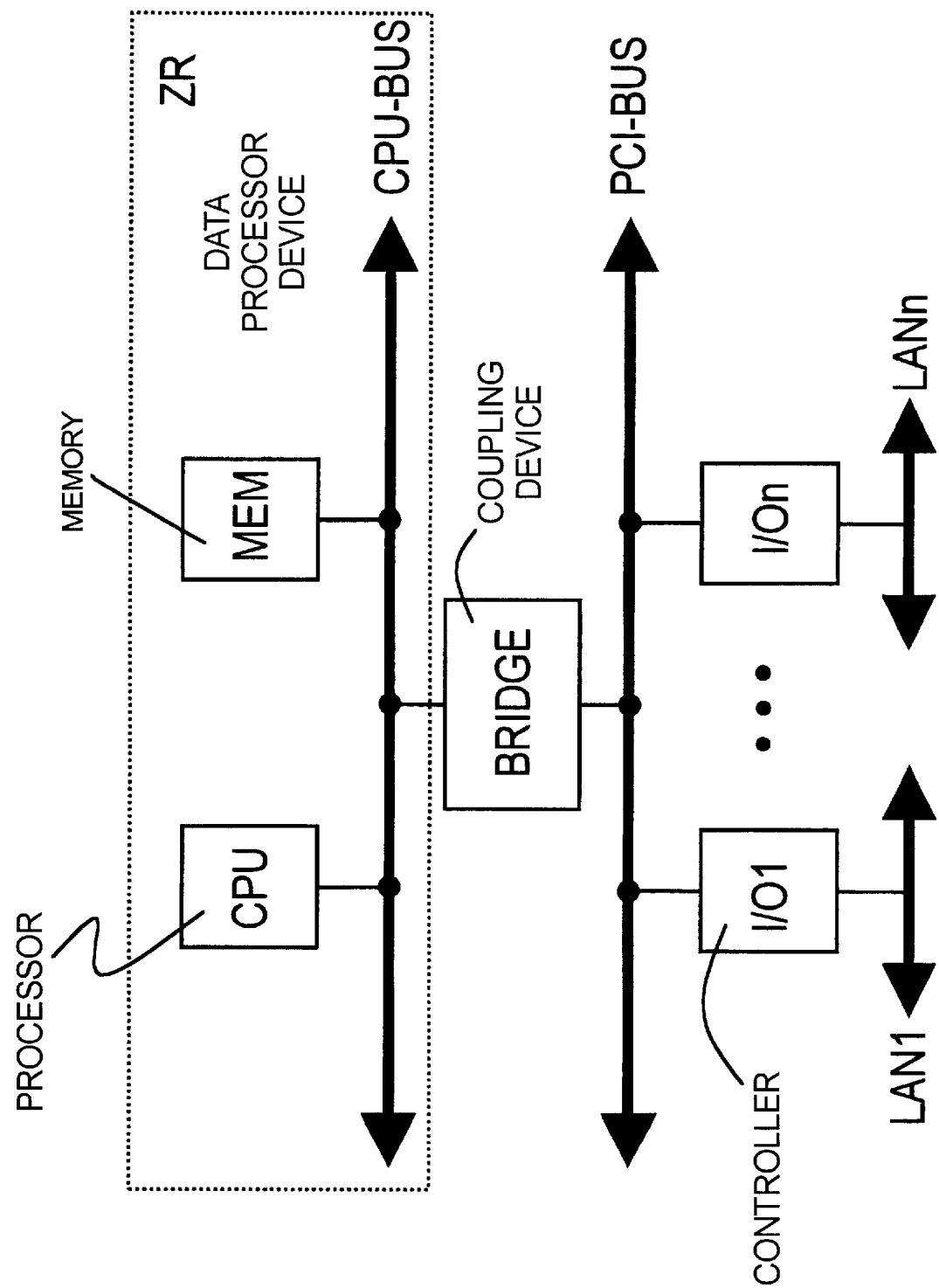
FIG. 1 depicts a structural illustration for the schematic depiction of the functional units participating in the framework of a data transfer.

FIG. 1 shows a schematic depiction of the functional units participating in a data transfer between a data processing means ZR and peripheral means LAN1, . . . , LANn. A processor CPU of the data processing means ZR is connected to a main memory MEM via a CPU bus. Programs for the processing by the processor CPU as well as appertaining data are stored in the main memory MEM. The peripheral means LAN1, . . . , LANn are connected to each other via a PCI bus. I/O controllers I/O1, . . . , I/On control the interface between the peripheral means LAN1, . . . , LANn and the PCI bus. Data which are transmitted from the peripheral means LAN1, . . . , LANn to units of the main computer system ZR, or from these to the peripheral means LAN1, . . . , LANn are temporarily stored in the I/O controllers I/O1, . . . , I/On. The CPU bus and the PCI bus are connected to each other for a data transfer via a coupling means BRIDGE.

Figure 2:
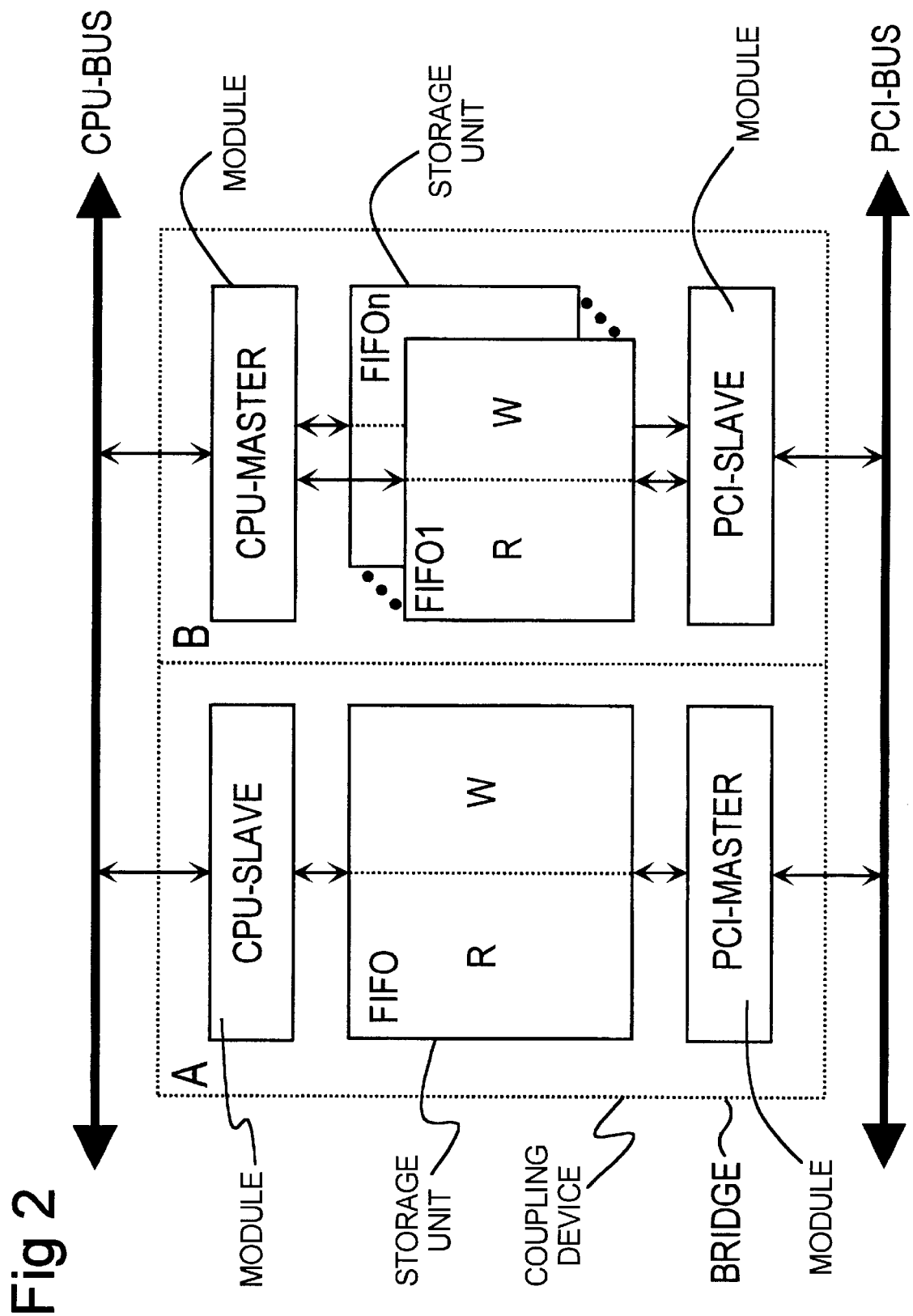
FIG. 2 depicts a structural illustration for the schematic depiction of the functional units of a coupling means according to FIG. 1.

FIG. 2 shows a schematic depiction of the functional units of the coupling means BRIDGE. The coupling means BRIDGE comprises two functional units A, B. The first functional unit A serves the transmission of data which are to be transmitted to a peripheral means LAN1, . . ., LANn or from this to the processor CPU on the basis of a request of the processor CPU. The second functional unit B serves the transmission of data which are to be transmitted from the appertaining peripheral means LAN1, . . . , LANn to the main memory MEM or from this to the peripheral means LAN1 ,. . . ,LANn on the basis of a request of an I/O controller I/O1, . . . , I/On.

The first functional unit A of the coupling means BRIDGE comprises a temporary storage unit FIFO (First In First Out) which is connected to the CPU bus via a first module CPU-SLAVE and to the PCI bus via a second module PCI-MASTER. The temporary storage unit FIFO is arranged in two submemories R, W, whereby in the first submemory R data are written by the second module PCI-MASTER and read by the first module CPU-SLAVE. In the second submemory W of the temporary storage unit FIFO data are written by the first module CPU-SLAVE and read by the second module PCI-MASTER.

The second functional unit B of the coupling means BRIDGE comprises a temporary storage unit FIFO1, . . . , FIFOn for each peripheral means LAN1, . . . , LANn connected to the PCI bus, this storage unit being specific to each individual means. The means-specific temporary storage units FIFO1, . . . , FIFOn of the second functional unit B are connected to the CPU bus via a third module CPU-MASTER and to the PCI bus via a fourth module PCI-SLAVE. As in the first functional unit A, the means-specific temporary storage units FIFO1, . . . , FIFOn comprise a first submemory R in which data are written by the fourth module PCI-SLAVE and read by the third module CPU-MASTER. In a second submemory W of the means-specific temporary storage units FIFO1, . . . , FIFOn data are written by the third module CPU-MASTER and read by the fourth module PCI-SLAVE.

If the processor CPU requires data from a peripheral means LAN1, . . . , LANn it sends a corresponding message to an arbitration module (not depicted) for the CPU bus. If the arbitration module for the CPU bus allocates the master function for the CPU bus to the processor CPU, this outputs a read request to the CPU bus along with the address of the I/O controller I/O1, . . . , I/On allocated to the peripheral means LAN1, . . . ,LANn. The master function is assigned to the processor CPU by the arbitration module for the CPU bus until the requested data are readied on the CPU bus. The first module CPU-SLAVE of the first functional unit A recognizes the address of the I/O controller I/O1, . . . , I/On and transmits the read request to the second module PCI-MASTER. This subsequently transmits a message to an arbitration module (not depicted) for the PCI bus. If the master function for the PCI bus is allocated to the second module PCI-MASTER by the arbitration module for the PCI bus, this outputs the read request to the PCI bus along with the appertaining address of the I/O controller I/O1 , . . . , I/On. The master function is assigned to the second module PCI-MASTER by the arbitration module for the PCI bus until the requested data are held ready on the PCI bus.

The addressed I/O controller I/O1, . . . , I/On recognizes the read request directed thereto and outputs the requested data onto the PCI bus. The second module PCI-MASTER takes over the data and writes them into the first submemory R of the temporary storage unit FIFO of the first functional unit A. The first module CPU-SLAVE reads the data from the first submemory R of the temporary storage unit FIFO and outputs them to the CPU bus. From there the data is read by the main memory and stored at the corresponding location in the main memory MEM. When the processor CPU transmits data to a peripheral means LAN1, . . . , LANn it transmits a corresponding message to the arbitration module for the CPU bus. If the arbitration module for the CPU bus allocates the master function for the CPU bus to the processor CPU, this applies a write request, and subsequently applies the data to be transmitted, along with the address of the I/O controller I/O1, . . . , I/On allocated to the peripheral means LAN1, . . . , LANn, at the CPU bus. The first module CPU-SLAVE of the first functional unit A recognizes the address of the I/O controller I/O1, . . . , I/On and transmits the write request to the second module PCI-MASTER. It simultaneously writes the data to be transmitted into the second submemory W of the temporary storage unit FIFO of the first functional unit A. The second module PCI-MASTER transmits a message to the arbitration module for the PCI bus. If the master function of the PCI bus is allocated to the second module PCI-MASTER by the arbitration module for the PCI bus, then this outputs the write request to the PCI bus along with the appertaining address of the I/O controller I/O1, . . . , I/On.

The addressed I/O controller I/O1, . . . , I/On recognizes the write request directed thereto and signals its readiness to receive data to the module PCI-MASTER. The module PCI master then reads the data from the second submemory W of the FIFO memory of the functional unit A and outputs these to the PCI bus, from which the addressed I/O controller I/O1, . . . , I/On takes them over.

Figure 3:
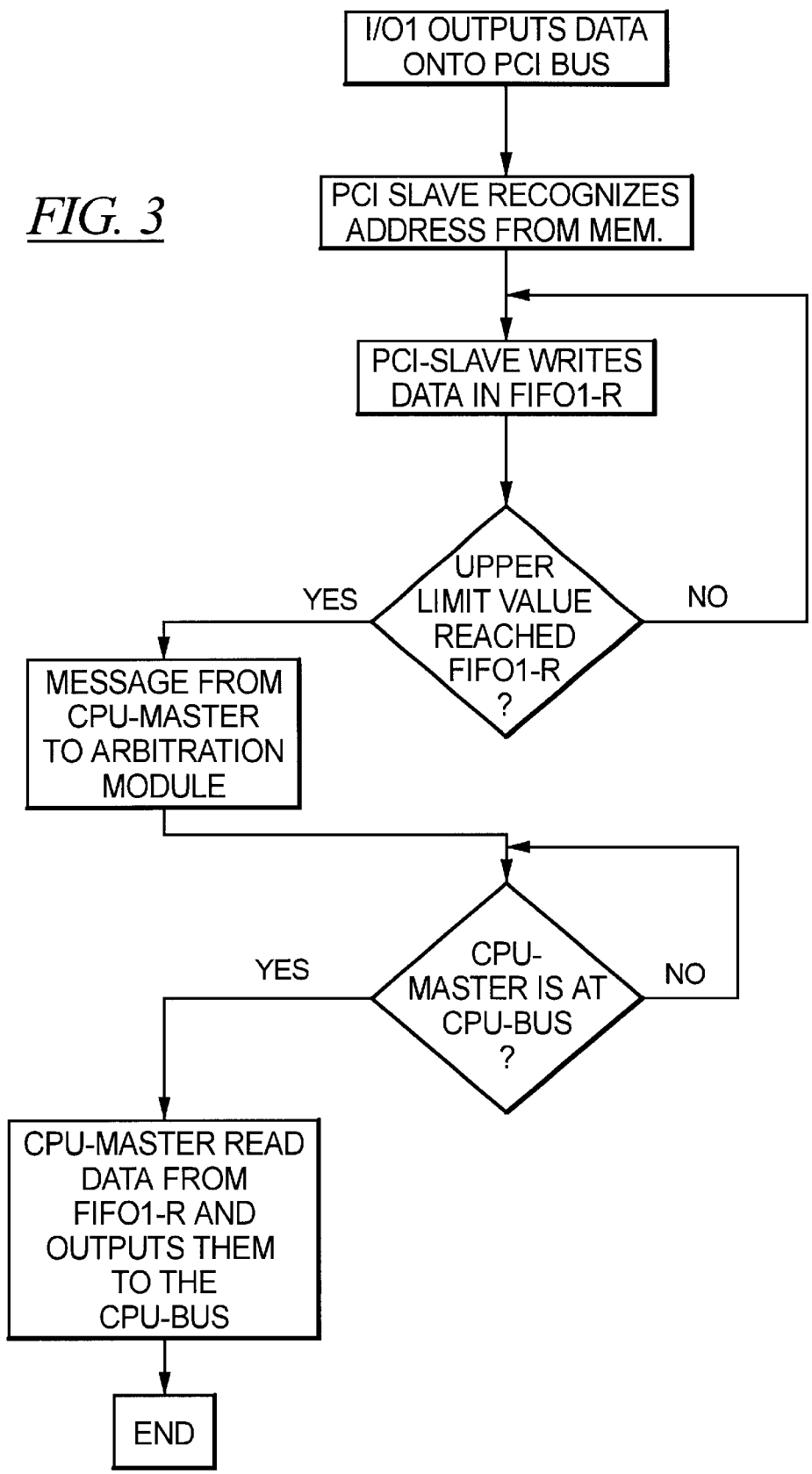
FIG. 3 depicts a flow diagram for a data transfer from a peripheral means to the main memory, this being initiated by an I/O controller.

FIG. 3 depicts a flow diagram for a data transfer between a first peripheral means LAN1 and the main memory MEM, this being initiated by a first I/O controller I/O1. If on the basis of a request of a first I/O controller data are transmitted from the appertaining first peripheral means LAN1 to the main memory MEM, the first I/O controller I/O1 transmits a corresponding message to the arbitration module for the PCI bus. If the arbitration module for the PCI bus allocates the master function for the PCI bus to the first I/O controller I/O1, this outputs the data to the PCI bus along with the address at which the data are to be stored in the main memory MEM. The fourth module PCI-SLAVE of the second functional unit B recognizes the address in the main memory MEM and writes the data with this address into the first submemory R of the first temporary storage unit FIFO1, which is allocated to the first peripheral unit LAN1.

Data are written into the first submemory R of the first temporary storage unit FIFO1 until an upper memory fill value is exceeded. Only then does the third module CPU-MASTER transmit a message to the arbitration module for the CPU bus. If the arbitration module for the CPU bus allocates the master function for the CPU bus to the third module CPU-MASTER, the third module CPU-MASTER reads the data from the first submemory R of the first temporary storage unit FIFO1 and outputs them to the CPU bus along with the address at which the data are to be stored in the main memory MEM until the first submemory R of the first temporary storage unit FIFO1 is emptied. The main memory MEM recognizes the address and stores the transmitted data at the corresponding location in the main memory MEM.

Figure 4A:
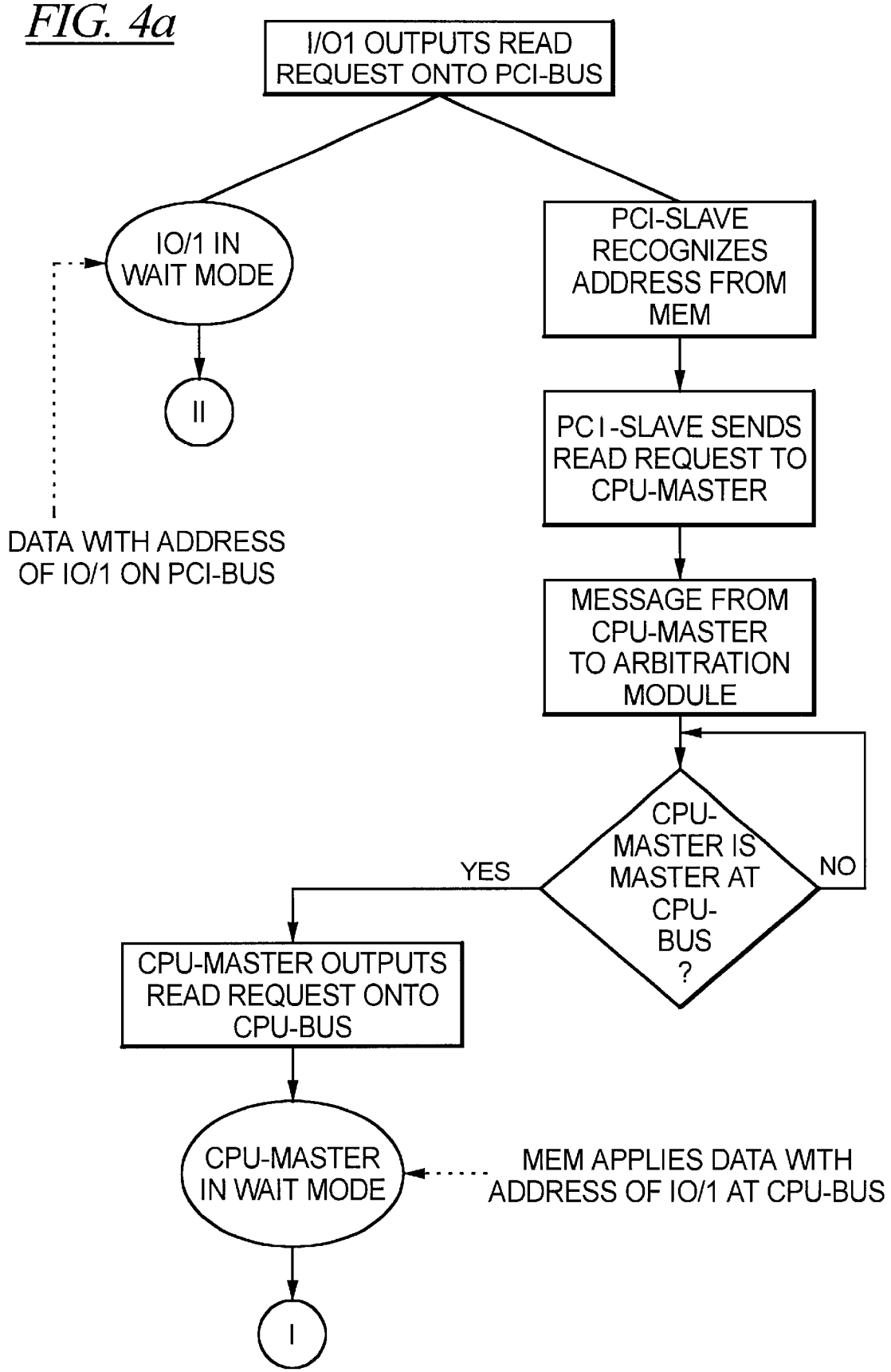
FIG. 4a depicts a flow diagram for a read request for a data transfer from the main memory to a peripheral means, this being initiated by an I/O controller.

FIG. 4a depicts a flow diagram for a read request for a data transfer from the main memory MEM to a first peripheral means LAN1, this request being initiated by a first I/O controller I/O1. If data are to be read from the main memory MEM on the basis of a request of a first I/O controller I/O1, then the first I/O controller I/O1 transmits a corresponding message to the arbitration module for the PCI bus. If the arbitration module for the PCI bus allocates the master function for the PCI bus to the first I/O controller I/O1, the first I/O controller I/O1 outputs the corresponding read request onto the PCI bus along with the address of the requested data in the main memory MEM. The master function is allocated to the first I/O controller I/O1 by the arbitration module for the PCI bus until the requested data are retrieved onto the PCI bus (continuation of the process, see FIG. 4b, mark "II"). The fourth module PCI-SLAVE of the second functional unit B recognizes the address in the main memory MEM and transmits the read request to the third module CPU -MASTER along with the address of the requested data in the main memory MEM.

The third module CPU-MASTER then transmits a message to the arbitration module for the CPU bus. If the arbitration module for the CPU bus allocates the master function for the CPU bus to the third module CPU-MASTER, the third module CPU-MASTER outputs the read request onto the CPU bus along with the address of the requested data in the main memory MEM. The master function for the CPU bus is allocated to the third module CPU-MASTER until the requested data are held ready on the CPU bus along with the address of the first I/O controller I/O1 (continuation of the process, see FIG. 4b, mark "I"). In addition to the data requested by the first I/O controller I/O1 the third module CPU-MASTER additionally requests data subsequently stored in the main memory MEM (data prefetching).

The main memory MEM recognizes the read request and outputs the data requested by the third module CPU-MASTER onto the CPU bus. The address up to which additional data from the main memory MEM are written onto the CPU bus is individually adjustable for each peripheral means LAN1, . . . , LANn. The amount of the data which are read out of the main memory MEM is limited by the size of the temporary storage units FIFO1, . . . , FIFOn, which is specific to the individual means.

Figure 4B:
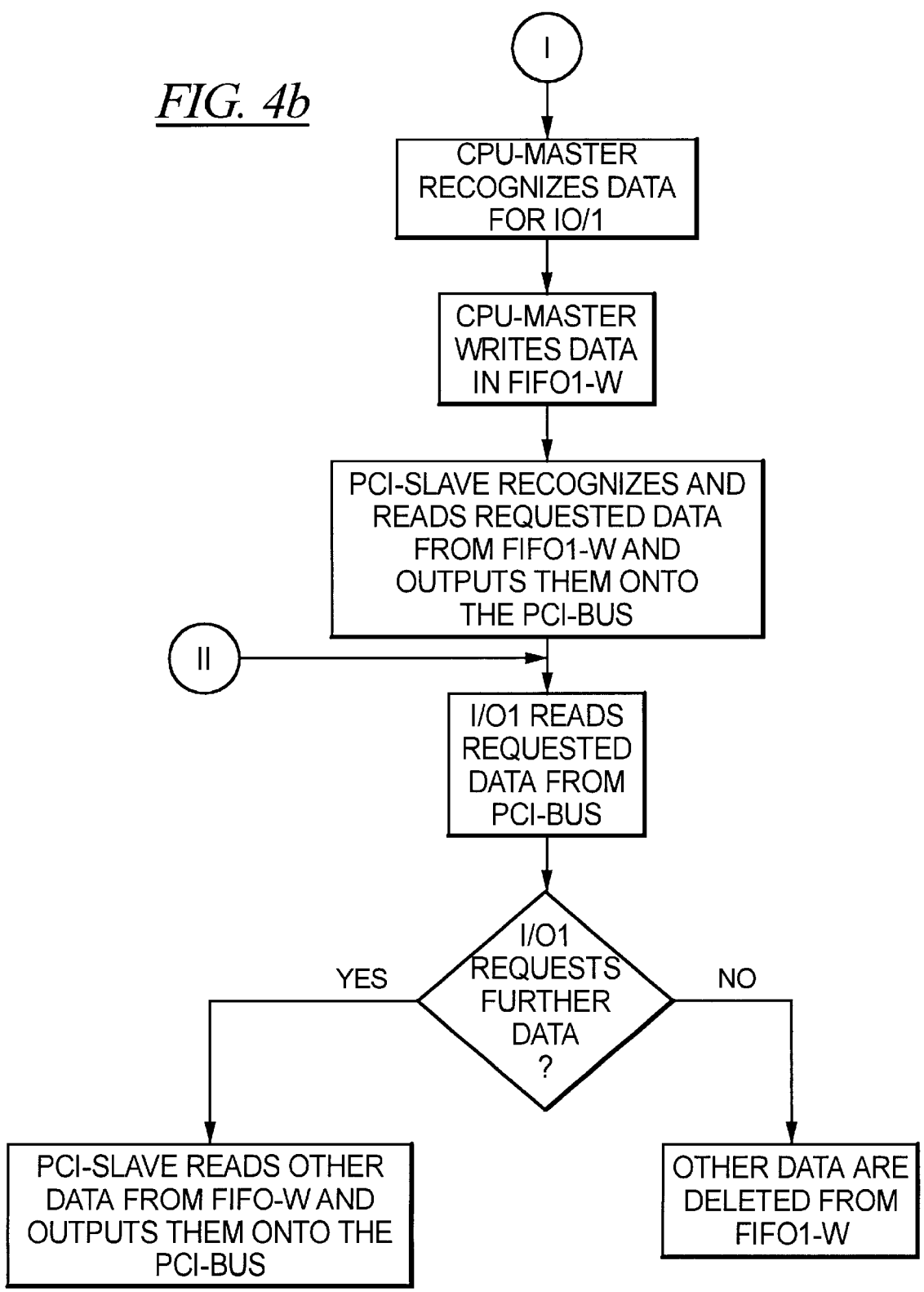
FIG. 4b depicts a flow diagram for a data transfer from the central computer system to a peripheral means, this being initiated by an I/O controller.

FIG. 4b depicts a flow diagram for a data transfer from the main memory MEM to the first peripheral means LAN1, this being initiated by a first I/O controller I/O1. After the data requested by the first I/O controller I/O1 and the other data from the main memory MEM has been outputted onto the CPU bus (continuation of marker "I" in FIG. 4a), the third module CPU-MASTER of the second functional unit B takes over the data from the CPU bus and writes the data, along with the address of the first temporary storage unit FIFO1, into the second submemory W of the first temporary storage unit FIFO1. The fourth module PCI-SLAVE recognizes the data requested by the first I/O controller I/O1 and outputs these along with the address of the first I/O controller I/O1 to the PCI bus. The first I/O controller I/O1 reads the requested data from the PCI bus and forwards these to the first peripheral means LAN1.

If the first I/O controller I/O1 requests the other data, then these are promptly written onto the PCI bus on the basis of a new read request by the fourth module PCI-SLAVE. But if the first I/O controller I/O1 requests data which are not temporarily stored in the second submemory W of the first temporary storage unit FIFO1 of the second functional unit B, then the other data are deleted from the second submemory W.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling a data transmission in a digital data processing means between a memory connected to a system bus and peripheral means connected to a peripheral bus, comprising the steps of:

providing data transmission via a coupling means which provides a bidirectional temporary storage of data and which connects the system bus and the peripheral bus;

temporarily storing data to be transmitted from a first peripheral means to a memory unit based on a request by said peripheral means in a first temporary storage unit; and temporarily storing data to be transmitted from the storage means to a relevant peripheral means in a second temporary storage unit, the temporary storage units being individually allocated to the relevant peripheral means, respectively.

2. The method according to claim 1, wherein for first temporary storage units an upper memory fill value is respectively setable;

given the exceeding of an upper memory fill value in one of the first temporary storage units access onto the system bus is requested by the coupling means; and subsequent to the granting of access data stored in said first temporary storage unit is outputted onto the system bus.

3. The method according to claim 1, wherein in addition to the data to be read from the memory unit in a framework of a request of a peripheral means, other data stored in the memory unit subsequently to said data is requested by the coupling means and is additionally stored in the second temporary storage unit allocated to the peripheral means.

4. The method according to claim 3, wherein for each peripheral means a value representing how much subsequently stored data is read from the memory and stored can be individually set.

5. The method according to claim 3, wherein given a further request of a peripheral means the coupling means checks if the requested data has already been stored in the second temporary storage unit allocated to the peripheral means as subsequently stored data in the course of a previous request, and wherein in this case an accessing of the system bus is eliminated.

6. The method according to claim 3, wherein if subsequently stored data is not requested by the peripheral means a deletion of the subsequently stored data from the second temporary storage unit allocated to the peripheral means is executed.

7. The method according to claim 1, wherein the coupling means has an auxiliary module via which data which is to be transmitted based on a request of a unit connected to the system bus is transmitted between the system bus and the peripheral bus.

8. The method according to claim 7, wherein data to be transmitted from a peripheral means to a unit connected to the system bus is temporarily stored in a first temporary storage unit, and data to be transmitted from a unit connected to the system bus to a peripheral means is temporarily stored in a second temporary storage unit, said temporary storage units being jointly allocated to all peripheral means.

9. A coupling device for connecting a peripheral bus to a system bus, whereby a plurality of peripheral means are connected to the peripheral bus, comprising:

first temporary storage units, for a temporary storage of data to be transmitted from a peripheral means to the system bus based on a request of a peripheral means;

said storage units being individually allocated to the peripheral means, respectively;

second temporary storage units for a temporary storage of data to be transmitted from the system bus to a relevant peripheral means based on a request of a peripheral means, said storage units being individually allocated to the peripheral means, respectively.

10. The coupling device according to claim 9, wherein the first and second temporary storage units which are respectively individually allocated to a peripheral means are FIFO memories.

* * * * *